E. J. GAGNON.
MULTIPLE SPINDLE MACHINE.
APPLICATION FILED MAR. 21, 1918.
1,304,173.
Patented May 20, 1919.
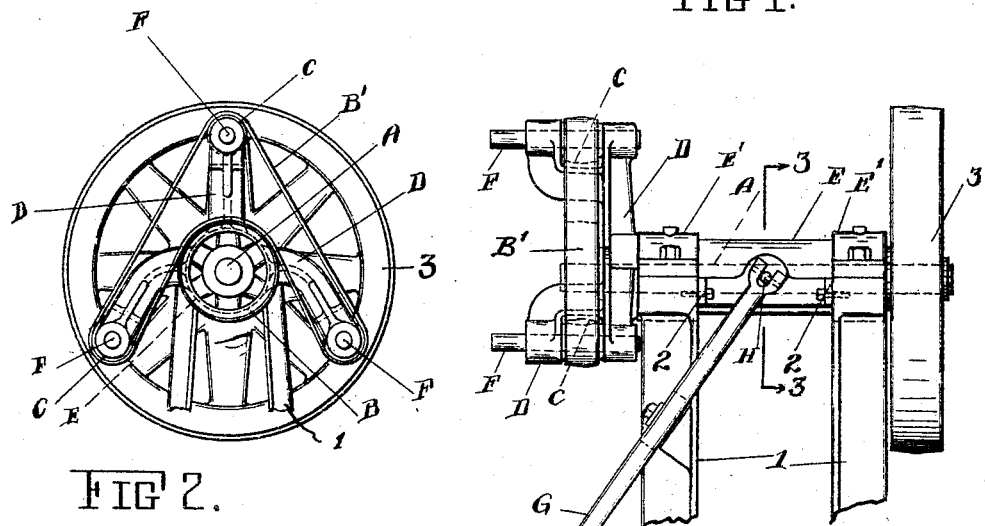
FIG. 1.
FIG. 2.
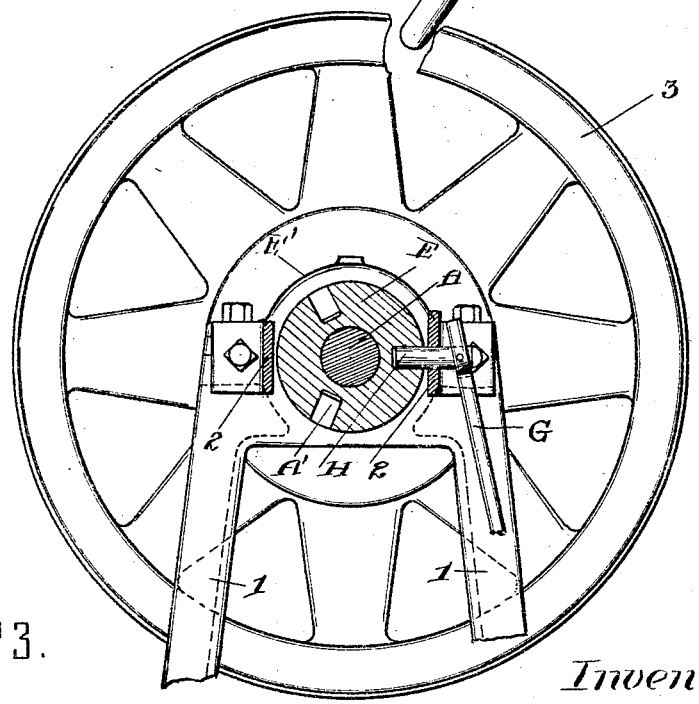
FIG. 3.
Inventor:
ELI J. GAGNON.
By
Attorney

UNITED STATES PATENT OFFICE.

ELI J. GAGNON, OF EXETER, NEW HAMPSHIRE.

MULTIPLE-SPINDLE MACHINE.

1,304,173.  Specification of Letters Patent.  Patented May 20, 1919.

Application filed March 21, 1918. Serial No. 223,833.

*To all whom it may concern:*

Be it known that I, ELI J. GAGNON, a citizen of the United States, residing at Exeter, county of Rockingham, State of New Hampshire, have invented certain new and useful Improvements in Multiple-Spindle Machines, of which the following is a specification.

This invention relates to improvements in multiple spindle machines, and particularly to machines of this type adapted for use in the manufacture of shoes.

In such machines, it is desirable to drive a plurality of rotating tools from a single power source, and to so mount the tools with relation to the power shaft as to permit a selected tool to be readily brought into convenient working position relative to the operative, the driving impulse of the power shaft being utilized to automatically effect such adjustment of the tool, while at the same time carrying those tools not immediately desired for use out of working position, so that the operative is relieved of the necessity of manually adjusting the machine to bring the particular tool desired for use into effective position.

To the end therefore of providing a machine embodying the above-mentioned features, and which, additionally, will be of compact and relatively simple construction, I have devised my present invention.

In the accompanying specification and drawings, I have described and illustrated a selected embodiment of my invention which has been found satisfactory in use and well adapted to the requirements of manufacture. Throughout the specification and drawings, like reference characters are correspondingly employed, and in the drawings:

Figure 1 is a front view of the head of a machine in accordance with my invention.

Fig. 2 is an end view thereof, and

Fig. 3 is an enlarged detail section on the line 3—3 of Fig. 1.

I have indicated at 1 a portion of the supporting frame-work for the head of my machine, such frame-work including spaced connected end rails 2 providing support for the power shaft A, which is inclosed in a sleeve E journaled in bearings $E^1$ bolted to said rails 2.

Fast on the sleeve E at one end thereof is a bracket or turret D constructed to support a plurality of arbors or spindles F, here shown as three in number, together with their sheaves C, in radial spaced assembly. The sheaves C are belted to each other by a belt $B^1$ which runs over a driving pulley B fast on the outer end of the power shaft. The arbors F may carry any appropriate tools, according to the nature of the particular operation to be performed, and if desired the outer end of the power shaft A may also be equipped to carry a tool.

Power is applied to the shaft A in any suitable manner, as by the pulley 3, and through pulley B, belt $B^1$, and sheaves C, rotates the arbors F at uniform speed.

The particular arbor F carrying the tool best suited for the work to be performed is adapted to be brought into convenient position relative to the operative by suitable clutch mechanism constructed and functioning to utilize the power delivered to shaft A to effect such positioning, the arrangement being such that the other arbors are simultaneously carried out of the way of the advanced arbor to permit this re-adjustment. As here shown, this adjustment may be conveniently made by means of a shipper lever G, suitably mounted on the frame of the machine, and carrying at its upper end a locking pin H adapted to seat in any of a plurality of radially disposed notches or recesses $A^1$ spaced about the periphery of the sleeve E. The notches $A^1$ correspond in number to the number of arbors F, and in spacing to the spacing of said arbors.

In operation, when it is desired to change the position of the arbors from that shown in the drawing to advance a different arbor into convenient relation to the operative, the shipper lever G is rocked on its pivot, against the action of any suitable spring (not shown), to withdraw the pin H from the particular notch in which it happens to lie. This releases the sleeve E, and permits said sleeve and with it the turret D, to turn about the shaft A as an axis under the driving impulse imparted to it by said shaft through the connections B, $B^1$ and C, until the selected arbor is brought into effective position, whereupon the pin H automatically seats in the notch A¹ now registered with it to prevent further rotation of the sleeve until a subsequent operation of the shipper lever G.

In my construction, therefore I am enabled not only to readily bring a desired tool, or a plurality of tools, into a pre-determined position, but effect such positioning by utilization of the power delivered to the machine. The action of the locking pin H in finding its seat in the selected notch that is advanced to it, after operation of the shipper lever, is entirely automatic, and inasmuch as these notches A¹ are spaced according to the spacing of the arbors F, all possibility of the particular arbor F desired for use not stopping at its pre-determined position relative to the operative is eliminated.

While I have shown and described a shipper lever for moving the locking pin, it will be understood that I may employ any other suitable actuating device, as a foot or knee-operated treadle.

Various other modifications may obviously be resorted to if within the limits of the appended claims.

What I therefore claim and desire to secure by Letters Patent is:

1. In a machine of the class described, in combination, a support, a power shaft journaled thereon, a turret adapted to rotate about said shaft as an axis and carrying a plurality of spaced arbors adapted to be selectively moved into a pre-determined position, power transmitting connections from said shaft to said arbors for driving said arbors, said connections tending to rotate said turret, and controlling means normally restraining said turret against rotation but operable to permit said connections to rotate said turret to bring a selected arbor into said predetermined position and then to automatically stop the rotation of said turret.

2. In a machine of the class described, in combination, a support, a power shaft journaled thereon, a turret adapted to rotate about said shaft as an axis and carrying a plurality of spaced arbors adapted to be selectively moved into a predetermined position, power transmitting connections from said shaft to said arbors for driving said arbors, said connections tending to rotate said turret, and clutch mechanism normally restraining said turret against rotation but operable to permit said connections to rotate said turret to bring a selected arbor into said predetermined position and then to automatically stop the rotation of said turret.

3. In a machine of the class described, in combination, a support, a power shaft journaled thereon, a sleeve inclosing a portion of said power shaft, and having a plurality of spaced peripheral notches, a plurality of spaced arbors carried by said sleeve and corresponding in number and spacing to the number and spacing of the notches, power transmitting connections from said power shaft to said arbors for driving said arbors, and a locking pin adapted to seat in any of said notches to normally lock the sleeve against rotation by the power shaft but withdrawable from the particular notch in which it happens to lie to permit the sleeve to turn about the power shaft under the driving impulse of said shaft as transmitted to the sleeve by said power transmitting connections whereby to automatically change the position of said arbors, and said pin automatically seating in a selected notch of the sleeve when said notch is registered with it to thereby stop rotation of the sleeve and lock the arbors in their new position of adjustment.

4. In a machine of the class described, in combination, a support, a power shaft journaled thereon, a sleeve inclosing a portion of said power shaft, and having a plurality of spaced peripheral notches, a turret carried by said sleeve, a plurality of spaced arbors mounted on said turret and corresponding in number and spacing to the number and spacing of the notches in said sleeve, power transmitting connections from said power shaft to said arbors for driving said arbors, a locking pin adapted to seat in any of said notches to normally lock the sleeve against rotation by the power shaft but withdrawable from the particular notch in which it happens to lie to permit the sleeve and with it the turret to turn about the power shaft under the driving impulse of said shaft as transmitted to the sleeve by said power transmitting connections whereby to automatically change the position of said arbors, and said pin automatically seating in a selected notch of the sleeve when said notch is registered with it to thereby stop rotation of the sleeve and lock the turret in its new position of adjustment, and means for moving said pin into and out of said notches.

5. In a machine of the class described, in combination, a support, a power shaft journaled thereon, a driving pulley fast on said shaft, a sleeve inclosing a portion of said shaft and adapted to rotate about said shaft as an axis and having a plurality of spaced peripheral notches, a turret fast on said sleeve, a plurality of spaced arbors carried by said turret and corresponding in number and spacing to the number and spacing of the notches in said sleeve, a sheave for each arbor, a belt connecting said sheaves with said driving pulley, and a shipper lever having a locking pin adapted to seat in any of said notches to normally lock the sleeve against rotation, but withdrawable from the particular notch in which it happens to lie upon operation of the shipper lever to permit the sleeve and with it the turret to turn about the power shaft as an axis under the driving impulse of said shaft as transmitted to the sleeve by the driving pulley, belt and sheaves, whereby to automatically change the position of said arbors, and said pin automatically seating in the next selected notch of the sleeve when said notch is registered with it to thereby stop rotation of the sleeve and lock the turret in its new position of adjustment.

In testimony whereof I affix my signature in presence of two witnesses.

ELI J. GAGNON.

Witnesses:
GEORGE H. PINKKAM.
ARTHUR W. GAGNON.

Copies of this patent may be obtained for five cents each, by addressing the "Commissioner of Patents Washington, D. C."